(12) United States Patent
Ruy et al.

(10) Patent No.: US 7,995,508 B2
(45) Date of Patent: Aug. 9, 2011

(54) ENERGY SAVING METHOD IN WIRELESS NETWORK

(75) Inventors: Jae Hong Ruy, Daejeon (KR); Jong Suk Chae, Daejeon (KR); Cheol Sig Pyo, Daejeon (KR); Bong Soo Kim, Daejeon (KR); Myung Jong Lee, Paramus, NJ (US); Tae Rim Park, New York, NY (US)

(73) Assignees: Electronics & Telecommunications Research Institute, Daejeon (KR); Research Foundation of the City University of New York, New York, NY (US)

( * ) Notice: Subject to any disclaimer, the term of this patent is extended or adjusted under 35 U.S.C. 154(b) by 594 days.

(21) Appl. No.: 12/171,657

(22) Filed: Jul. 11, 2008

(65) Prior Publication Data

US 2009/0147715 A1    Jun. 11, 2009

(30) Foreign Application Priority Data

Dec. 11, 2007   (KR) .................. 10-2007-0128228
Jul. 7, 2008   (KR) .................. 10-2008-0065595

(51) Int. Cl.
*H04W 52/02*   (2009.01)
(52) U.S. Cl. .................. 370/311; 455/574; 455/343.2
(58) Field of Classification Search .................. 370/311; 455/574, 343.2, 343.3, 343.4
See application file for complete search history.

(56) References Cited

U.S. PATENT DOCUMENTS

2007/0264963 A1*  11/2007  Srinivasan et al. ......... 455/343.2
2010/0150043 A1*  6/2010   Kim et al. .................... 370/311
2011/0002251 A1*  1/2011   Shin et al. .................... 370/311

OTHER PUBLICATIONS

Tae Rim Park et al., "Power Saving Algorithms for IEEE 802.15.5", Jul. 2007.
Tae Rim Park et al., "Energy Saving protocol for Mesh networks", Sep. 2007.
Yuen Hui Chee, et al., "Ultra Low Power Transmitters for Wireless Sensor Networks", May 15, 2006; Electrical Engineering and Computer Sciences University of California at Berkeley; pp. 1-128.
Joseph Polastre, et al., "Versatile Low Power Media Access for Wireless Sensor Networks", Nov. 3-5, 2004, pp. 1-13.

* cited by examiner

*Primary Examiner* — Melvin Marcelo
(74) *Attorney, Agent, or Firm* — Kile Park Goekjian Reed & McManus PLLC

(57) ABSTRACT

Provided is a method of minimizing power consumed by each node in a wireless network when communicating with neighboring nodes.
Unlike a conventional synchronous media access control (MAC), the present invention suggests an asynchronous MAC. Thus, the active duration of a node extends only when transmitting a large quantity of data and the extended active duration returns to the minimum active duration again after completing the data transmission.

12 Claims, 9 Drawing Sheets

ENERGY SAVING METHOD IN WIRELESS NETWORK

CROSS-REFERENCE TO RELATED PATENT APPLICATION

This application claims the benefit of Korean Patent Application No. 10-2007-0128228, filed on Dec. 11, 2007, and Korean Patent Application No. 10-2008-0065595, filed on Jul. 7, 2008, in the Korean Intellectual Property Office, the disclosure of which is incorporated herein in its entirety by reference.

BACKGROUND OF THE INVENTION

1. Field of the Invention

The present invention relates to a method of minimizing power consumed by each node in a wireless network, and in particular, in a mesh network.

The present invention is supported by the Information Technology (IT) Research & Development (R&D) program of the Ministry of Information and Communication (MIC) and the Institute for Information Technology Advancement (IITA) [2005-S-038-03, Development of UHF RF-ID and Ubiquitous Networking Technology].

2. Description of the Related Art

Since sensor nodes in a wireless sensor network environment operate based on limited energy, much research has been conducted on low power operation thereof. In particular, since a general sensor node operating using batteries does not support low power, services provided by the sensor node can be blocked. Accordingly, research on a low power protocol has been actively conducted.

In zigbee MAC, a synchronous communicating method generally used includes adjusting the communication time of each node. A system using such method is formed of a plurality of nodes which can be classified into a general node, a router node, and a sink node. The general node is the lowest portion for performing time synchronization. The router node receives a beacon message from a sink node or another router node and transmits the beacon message to a lower router or a general node, thereby matching the time of each node. The sink node mainly performs time synchronization in a network and transmits synchronization information, such as policy and time, in a network to a general node or a router node. Such method hardly adjusts synchronization and supports low power.

SUMMARY OF THE INVENTION

The present invention provides an energy saving method so that a node can minimize power consumption by increasing activation time when data to be transmitted by the node exists in a mesh network and by minimizing activation time when data to be transmitted by the node does not exist in mesh network.

According to an operation of the mesh network when the active duration of the node is minimized, the active duration extends only when communicating a large quantity of data so as to save and minimize the power consumption and the extended active duration returns to the minimum active duration after completing data transmission, thereby flexibly varying the active duration.

According to an aspect of the present invention, there is provided an energy saving method performed in a node in a wireless network, the method including: receiving a wakeup notification from a destination node by a source node having data to be transmitted, wherein the source node is one of a plurality of nodes sending a wakeup notification in a regular interval and a wakeup notification interval is equal to a wakeup interval formed of an active duration and an inactive duration; and transmitting data within an active duration of the destination node when the active duration estimated based on the wakeup notification is greater than a data size.

According to another aspect of the present invention, there is provided an energy saving method performed in node in a wireless network, the method including: requesting extension of an active duration to neighboring nodes by a source node having data to be transmitted, wherein the source node is one of a plurality of nodes sending a wakeup notification in a regular interval and a wakeup notification interval is equal to a wakeup interval formed of an active duration and an inactive duration; and broadcasting data to the neighboring nodes after completing the request.

According to another aspect of the present invention, there is provided a node that operates in an energy saving mode in a network, the node including: a receiver receiving a wakeup notification from a first node in the network; and a transmitter sending a wakeup notification in the same interval as the first node and transmitting data in an active duration estimated based on the wakeup notification received from the first node, wherein the wakeup notification interval is equal to a wakeup interval formed of the active duration and an inactive duration and wakeup interval start times of nodes of the network are not synchronized with each other.

Also, the transmitter transmits data within the active duration when the estimated active duration of the first node is greater than data size and requests an extension of the active duration to the first node when the active duration is less than the data size, and transmits data within the extended active duration after receiving a response to the extension of the active duration from the first node.

Also, the receiver receives a request for an extension of the active duration from a second node and receives data in the extended active duration from the second node, wherein the transmitter transmits a response to the extension of the activation duration to the second node.

The extended active duration returns to an initial active duration when data transmission is completed.

According to another aspect of the present invention, there is provided a computer readable recording medium having embodied thereon a computer program for executing the energy saving method performed in a node in a wireless network.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
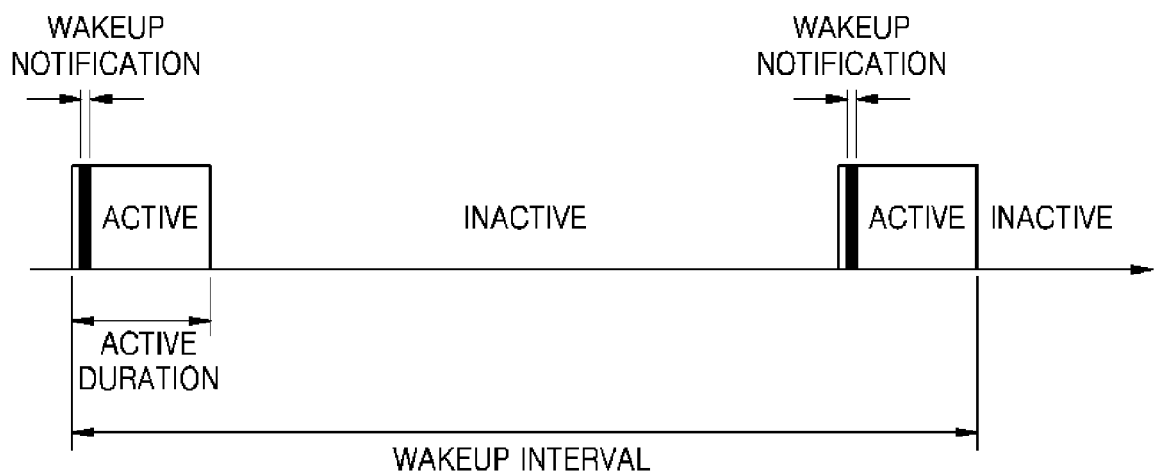
FIG. 1 is a diagram illustrating a time structure according to an embodiment of the present invention.

The present invention will now be described more fully with reference to the accompanying drawings, in which exemplary embodiments of the invention are shown. In the drawings, like reference numerals denote like elements, and the sizes and thicknesses of layers and regions are exaggerated for clarity. In addition, it will also be understood that when some part "includes" some elements, other elements can be further included, instead of excluding them, as far as, there is no particular opposite description.

The present invention is directed to a method of minimizing power (energy) consumption when a node communicates with neighboring nodes in a mesh network. Unlike a conventional synchronous media access control (MAC), the present invention discloses an asynchronous MAC.

The synchronous communicating method generally used includes adjusting the communication time of each node and a sink node is the main in the time synchronization. However, in this method, communication is accomplished only when the time is matched and it is difficult to accurately match the time. Also, when such method is used, more power is consumed by each node.

Thus, in the present invention, data is transmitted using asynchronous MAC. Command frames used in an energy saving for a mesh layer (ESM) of the present invention are Wakeup Notification WN, Extension REQuest EREQ, and Extension REPly EREP. The Wakeup Notification WN is transmitted to notify the status of a node while entering an active duration. The Extension REQuest EREQ is transmitted to extend the active duration of a reception node. The Extension REPly EREP is transmitted to respond to the Extension REQuest EREQ.

According to the present invention, a node receiving data (hereafter, reception node) periodically unicasts a wakeup message and a node transmitting data (hereafter, transmission node) broadcasts data. In order for the transmission node to transmit data, a wakeup period of neighboring nodes may be analyzed and the transmission node may await a wakeup notification from the neighboring nodes. When the transmission node receives a wakeup notification from the neighboring node, the transmission node transmits a message. In addition, for low power consumption, when data to be transmitted does not exist, the transmission node minimizes the active duration and when data to be transmitted exists, the transmission node transmits the Extension REQuest EREQ message for extending the active duration to the reception node. The reception node transmits the Extension REPly EREP for responding to the Extension REQuest EREQ message to the transmission node.

The algorithm suggested in the present invention is accomplished by a method of transmitting data and adjusting the active duration according to the amount of data.

In the present invention, ESM denotes an energy (power) saving mode using an asynchronous time schedule. The time structure of a node (device) for ESM includes an active duration and an inactive duration. A command frame referred to as wakeup notification WN, is transmitted at the beginning of the active duration. However, the active durations of nodes are not synchronized.

In the data frame transmission, ESM is divided into two different transmission mechanisms: ESM unicasting and ESM broadcasting.

In ESM unicasting, a node uses a receiver-oriented mechanism. That is, a transmission node waits until a reception node enters the active duration. Then, the transmission node transmits a data frame within the active duration of the reception node. In ESM broadcasting, a transmission node uses a transmitter-oriented mechanism. That is, the transmission node wakes up all neighboring nodes up by transmitting command frames for a time duration longer than a wakeup interval, thereby broadcasting the data frame.

FIG. 1 is a diagram illustrating a time structure according to an embodiment of the present invention.

Referring to FIG. 1, a time line of a node is divided into wakeup intervals. Each wakeup interval is then subdivided into an active duration and an inactive duration. In the active duration, a node notifies that it is in the active duration by transmitting a wakeup notification command. Then, the node waits for possible frame transmission. In the inactive duration, a node enters a low power (sleep) mode by turning off a receiver circuitry.

All nodes may have the same wakeup interval but may have different active durations. The active durations of the nodes are not synchronized. Each node transmits a Wakeup Notification WN command at the beginning of its active duration in order to notify neighboring nodes that it is in the active duration. When the Wakeup Notification WN command is transmitted, the wakeup interval and active duration of each node are notified to neighboring nodes. Thus, when a node receives the Wakeup Notification WN command from a neighboring node, the node can know the neighbor node is in the active duration and the time for the neighboring node to move to the sleep mode again.

Figure 2:
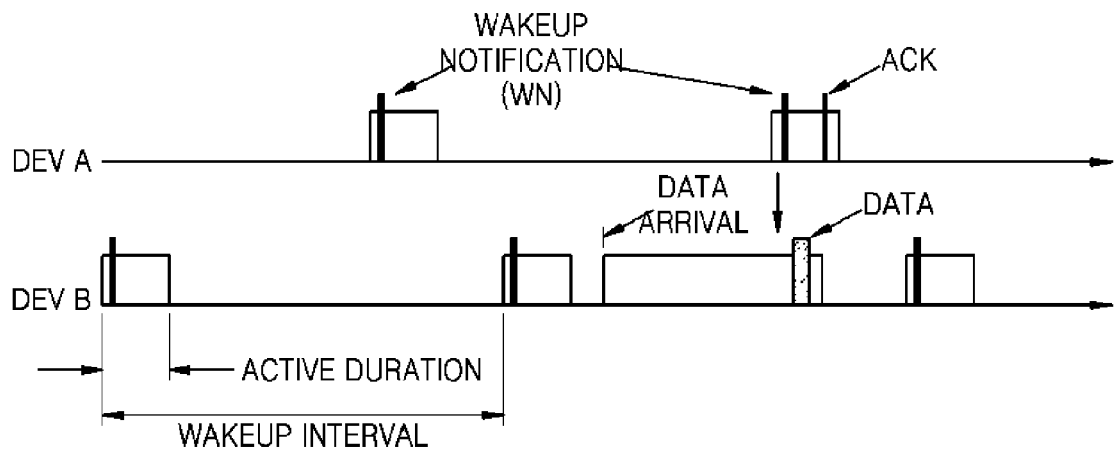
FIGS. 2 and 3 are diagrams for explaining energy saving for mesh layer (ESM) unicasting, according to an embodiment of the present invention.
Figure 3:
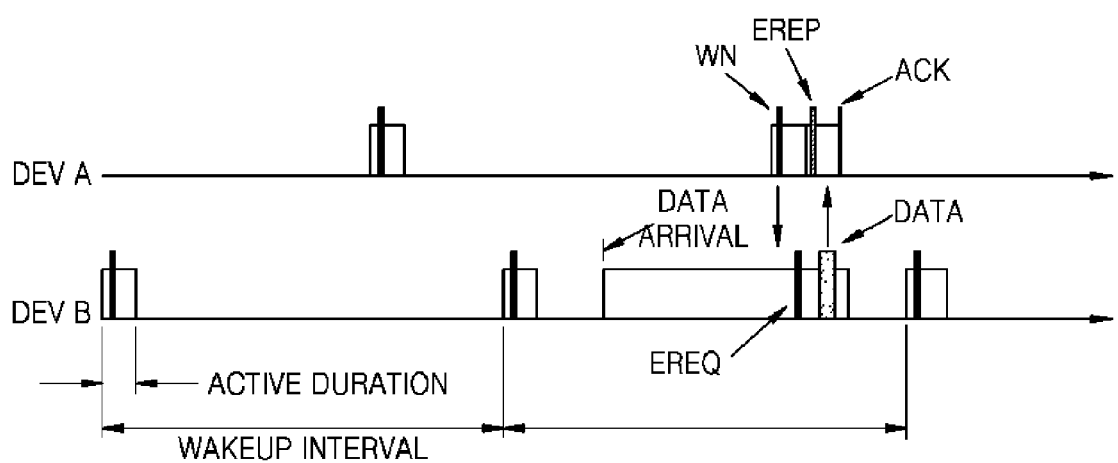

FIGS. 2 and 3 are diagrams for explaining ESM unicasting, according to an embodiment of the present invention.

Referring to FIG. 2, when the active duration of a node A (Dev A) is sufficient for data transmission, data is transmitted without adjusting the active duration. The node A (Dev A) and a node B (Dev B) are neighboring nodes. A period of each node is equal to the wakeup interval WI. The length of the wakeup interval WI is the same in both node A and node B, but the beginning time thereof is different from each other. The wakeup interval WI corresponds to the length between the Wakeup notifications WN. Also, the wakeup interval WI is divided into the active duration and the inactive duration. The active duration means a node sends and receives data. The inactive duration means a node does not send or receive data and remains in a sleep mode. Each node operates in the minimum activation duration.

The Wakeup notification WN message is transmitted from each node. When the data to be transmitted from the node B to the node A exists (Data arrival), the node B waits until it receives the Wakeup notification WN message transmitted from the node A. When the node B receives the Wakeup notification WN message from the node A, the node B transmits its data to the node A, since the node A is in an active state. Then, the node B goes back in a sleep (inactive) state. After the node A receives the data, the node A can transmit a reception acknowledgement message ACK to the node B.

Referring to FIG. 3, data is transmitted due to adjustment of the active duration of the node A. The time structure of FIG. 3 is the same as that illustrated in FIG. 2. When transmitting data from the node B (Dev B) to the node A (Dev A), if it is determined that the transmission data is large so that the data cannot be transmitted during the corresponding wakeup interval WI or when the active duration is too short so that data cannot be transmitted, the node B transmits the Extension REQuest EREQ message, requesting to extend the activation duration, to the node A. When the node A receives the Extension REQuest EREQ message, the node A extends its activation duration in proportion to the quantity of data transmitted from the node B and transmits the Extension REPly EREP message including the extended time is transmitted to the node B, in response to the Extension REQuest EREQ message. The node B analyzes the received Extension REPly EREP message and transmits the message to the node A during the corresponding active duration. Then, when the data is completely received, the node A returns the active duration to the original minimum time. When data is received, the node A can transmit the reception acknowledgement message ACK to the node B.

Figure 4:
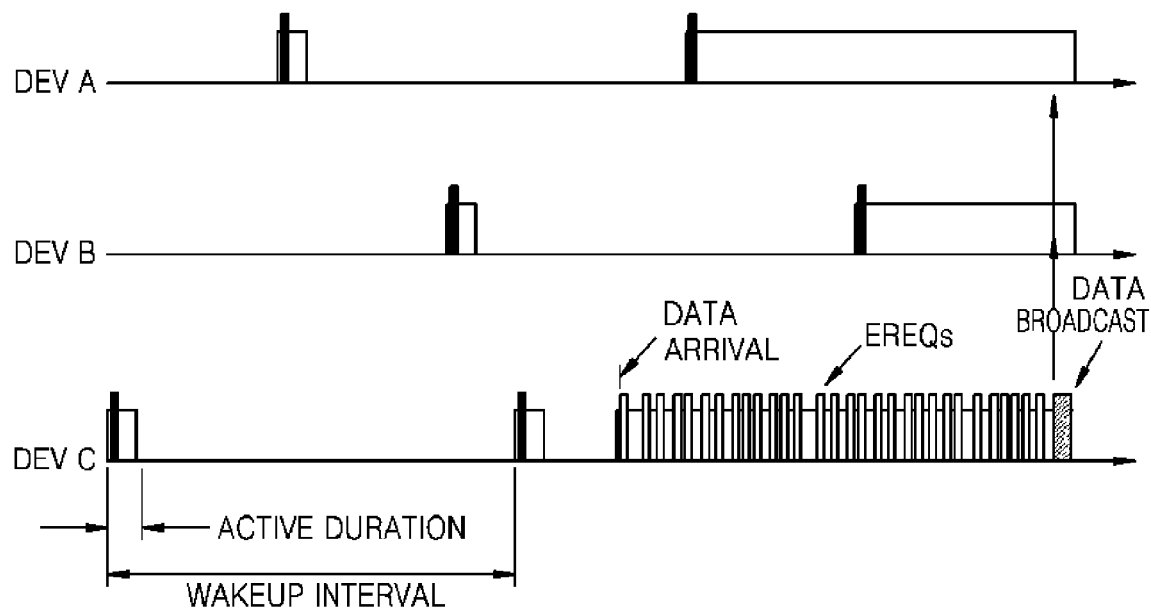
FIG. 4 is a diagram for explaining ESM broadcasting, according to an embodiment of the present invention.

FIG. 4 is a diagram for explaining ESM broadcasting, according to an embodiment of the present invention.

Referring to FIG. 4, when data to be broadcasted exists (data arrival), a node C (Dev C) transmits the Extension REQuest EREQ message, requesting the active duration that is longer than the wakeup interval, to the neighboring nodes including the node A (Dev A) and the node B (Dev B) and broadcasts the data frame.

When the Extension REQuest EREQ message is received, the nodes A and B extend their active durations and receive data.

Hereinafter, network operations of nodes using the ESM mode according to the present are described.

For ESM mode operation, MAC primitives and PAN (personal area network) information base (PIB) variables to control the MAC layer and a mesh layer timer of 1 ms resolution as a reference clock are required.

ESM uses the MAC primitives such as MAC common part sub-layer (MCPS)-DATA, MCPS-PURGE, and MAC sub-layer management entity (MLME)-SET. MCPS-DATA is used to transmit or receive a command frame. MCPS-PURGE is used to remove a pended frame. MLME-SET is used to turn on/off the receiver circuitry. The mesh layer turns off the receiver circuitry by setting the macRxOnWhenIdle attribute in MAC PIB to FALSE. In addition to macRxOnWhenIdle, macMinBE and macMaxCSMABackoff need to be adjusted by the mesh layer in the ESM mode. For maximum energy saving, a prompt response from the MAC is essential.

With regard to the mesh layer timer, the basic time unit is defined as meshTimeUnit, which is equal to 1 ms. All timing parameters defined in ESM use meshTimeUnit as a time unit and all operations are based on the mesh layer timer.

The time structure in which the wakeup interval, which can be divided into the active duration and the inactive duration, is repeated can be described using variables of meshWakeupOrder, meshActiveOrder, meshBaseActiveDuration. The MESH PIB attribute, meshWakeupOrder, describes the interval of the periodic wakeup. As an example, the values of meshWakeupOrder, WO, and the wakeup interval, WI, may be respectively $0 \leq WO \leq 14$ and WI=meshBaseActiveDuration*2WO ms. In this case, if meshWakeupOrder, WO is equal to 15, a node is always in the active duration without transmitting the Wakeup notifications WNs. Therefore, the wakeup interval WI does not exist. The value meshActiveOrder is ignored if meshWakeupOrder WO is equal to 15.

The MESH PIB attribute, meshActiveOrder, describes the length of the active duration within the wakeup interval. The values of meshActiveOrder, AO, and the active duration, AD, may be respectively $0 \leq AO \leq WO \leq 14$ and AD=meshBaseActiveDuration*2AO ms.

Frame transmission of ESM is controlled by two variables, meshESMExpected and meshESMOn. meshESMExpected controls the transmission method for start/join procedure.

If the value of meshESMExpected is TRUE, a node assumes that the network is running in the ESM mode. Then, the node performs an ESM initialization procedure. If the value meshESMExpected is FALSE, the node performs an initialization procedure without considering ESM.

meshESMOn decides whether a node is in the ESM mode. After joining the node to a network, the node transmits the Wakeup notifications WNs periodically as defined in meshWakeupOrder if the node sets meshESMOn to TRUE. In addition, the node has an active duration and an inactive duration as defined in meshActiveOrder. The active durations of nodes may not be synchronized. If the value of meshESMOn is FALSE, all frames are transmitted without considering ESM.

ESM unicasting starts when MESH-DATA.request is issued. When meshESMOn is TRUE, the mesh sub-layer of a source node for transmitting data turns on the receiver circuitry and waits until it receives the Wakeup notification WN from a destination node. Upon receiving the Wakeup notification WN, the source node copies the value of meshActiveOrder in the payload to meshDestActiveOrder, DO. After receiving the Wakeup notification WN, the source node estimates that the destination node is in the active duration. Here, if the elapsed time of the mesh timer is shorter than the time determined by meshBaseActiveDuration*2DO, the source node can estimate that the destination node is in the active duration.

If the receiver of the destination node is in the active duration, a transmitter of the source node selects one of two transmission methods to use according to the remaining active duration of the receiver. When the receiver of the destination node is in the active duration and the remaining active duration of the receiver is long enough to transmit a data frame, the transmitter of the source node transmits the data frame. Here, MCPS-DATA.request is used. If the remaining active duration is not enough to transmit the long data frame, the transmitter of the source node transmits an extension request EREQ command frame. In addition to the condition, if the remaining active duration is not enough to transmit the long data frame, but longer than or equal to 3*meshTimeUnit or more, the transmitter of the source node transmits the extension request EREQ command frame. The extension request EREQ command frame is a command frame to extend the active duration of the receiver of the destination node. If the extension request EREQ command is a command frame broadcasted at the MAC layer, the destination address is included in the mesh payload.

The destination node, upon receiving the extension request EREQ, checks the destination address. If the address matches its own mesh address or 0xffff, the destination node extends the active duration by the time duration defined in meshEREQTime. Then, the destination node transmits the extension reply, EREP, to the source node which in turn transmits the extension request EREQ, if the destination node has the address of the source node in the extension request EREQ.

The transmitter of the source node which transmits the extension request EREQ transmits a data frame after receiving the extension resply, ERER.

As an example, a node may have the minimum active duration, meshBaseActiveDuration, without considering a long data frame in order to achieve the maximum power saving. In order to transmit a long data frame to the neighboring node, the transmitter of the node should requests an active duration extension. Therefore, when the nodes set AO to 0, handshaking between the extension request EREQ and the extension reply, EREP, can be mainly used.

If the MAC layer confirms with SUCCESS, the mesh layer transmits MESH-DATA.confirm to the upper layer to inform SUCCESS.

Figure 5:
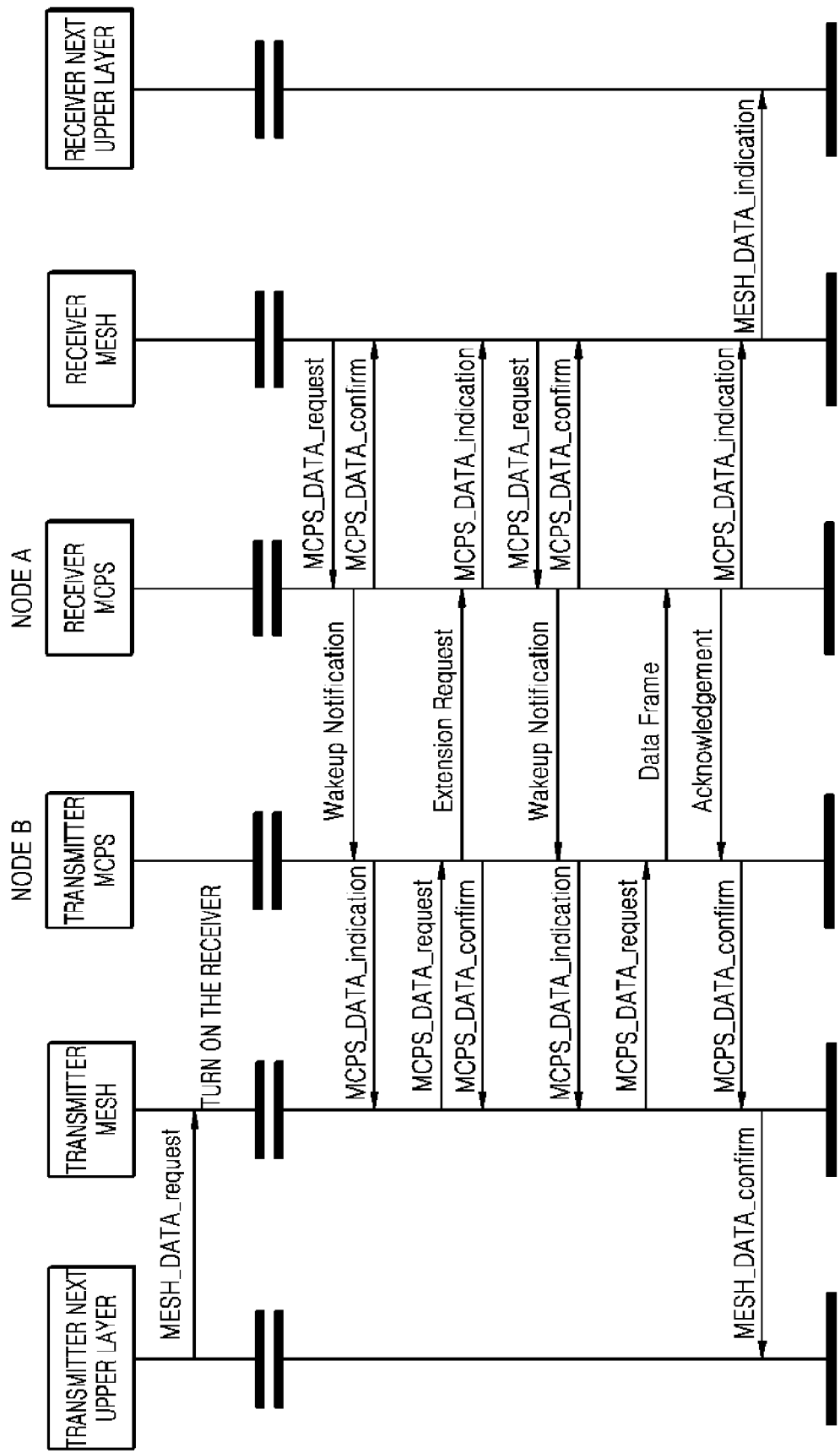
FIG. 5 is a diagram illustrating a flow of a message used by a node in ESM unicasting, according to an embodiment of the present invention.

FIG. 5 is a diagram illustrating a flow of a message used by a node in ESM unicasting, according to an embodiment of the present invention.

Referring to FIG. 5, in node B having data to be transmitted, when MESH_DATA.request is transmitted from the upper layer to the mesh layer of a transmitter, the mesh sub-layer (MCPS) turns on a receiver. The node A notifies the wakeup state (Wakeup Notification) to the node B and the node B requests extension of the active duration to the node A (Extension Request). The node A responds to the node B in response to the extension request. The node B transmits a data frame to the node A and the node A transmits the acknowledgement message ACK to the node B.

In node A and node B, MCPS_DATA.request is transmitted from the mesh layer to the mesh sub-layer (MCPS) before transmitting the commands frames such as wakeup notification, extension request, and extension response and the data frames. Also, after transmitting the frames, MCPS_DATA.confirm is transmitted from the mesh sub-layer (MCPS) to the mesh layer. In addition, in node A and node B, MCPS_DATA.indication is transmitted from the mesh sub-layer (MCPS) to the mesh layer after receiving the command frames.

After completing data frame transmission, when the ACK is transmitted from the node A to the node B, MCPS_DATA.confirm is transmitted from the mesh sub-layer (MCPS) to the mesh layer and MESH_DATA.confirm is transmitted from the mesh layer to the mesh upper layer in the node B.

Meanwhile, when the node cannot receive the frames properly, each node can be operated as follows.

Lost Wakeup Notification WN: When a mesh layer of a node has a frame to be transmitted, a receiver circuitry is turned on to receive a Wakeup Notification WN of a destination node. At this time, the node sets a timer that will expire after one wakeup interval. If the timer expires before receiving the Wakeup Notification WN, the node increases a ESM retry counter ERC by one. If the ERC is less than meshMAXNumESMRetries, which is the maximum number of retries, the mesh layer retries waiting the Wakeup Notification WN again. If the ERC is equal to or greater than meshMAXNumESMRetries, the mesh layer issues MESH-DATA.confirm with status TRANSACTION_EXPIRED. Thus, data transmission is completed and the ERC is initialized.

Lost Extension REPly EREP: When a mesh layer of a node transmits an Extension REQuest EREQ, the node sets a timer to be expired after meshEREPTime. If the timer expires before receiving the Extension REPly EREP, the node increases ERC by one. If ERC is less than meshMAXNumESMRetries, the mesh layer retries waiting a next Wakeup Notification WN while turning on a receiver circuitry, or by estimating the next Wakeup Notification WN time and turning off the receiver circuitry until the estimated time. If ERC is equal to or greater than meshMAXNumESMRetries, the mesh layer issues MESH-DATA.confirm with status CHANNEL_ACCESS_FAILURE.

Lost acknowledgement message ACK: If a mesh layer of a node issues an MAC primitive for data transmission, the execution of the primitive relies on a MAC layer operation. The mesh layer should wait for the confirmation from the MAC layer. When MCPS-DATA.confirm is returned by the MAC layer within an active duration of the destination node receiver or extended active duration of the receiver, the mesh layer issues MESH-DATA.confirm with the same status to the upper layer. However, if the active duration or extended active duration of a destination node receiver is expired before receiving confirmation from the MAC layer of the node, the mesh layer may issue MCPS-PURGE.request to cancel the MAC layer transmission. Otherwise, the MAC layer may issue MCPS-DATA.confirm with NO_ACK status. In either case, the mesh layer increases ERC by one and performs the retry procedure described above.

Lost data.: If a mesh layer of a destination node receiver receives the Extension REQuest EREQ, the destination node sets a timer to be expired after meshDATATime. If the timer expires before receiving a data frame or another Extension REQuest EREQ and the active duration of the destination node receiver ends, the receiver may enter an inactive duration.

Broadcast transmission starts when MESH-DATA.request is issued for broadcast, reliable broadcast, or multicast. If meshESMOn is TRUE, the mesh sub-layer (MCPS) of the source node for transmitting data turns on its receiver and transmits the Extension REQuests EREQs for the time duration longer than one wakeup interval. The destination address in the mesh payload of Extension REQuest EREQ should be 0xffff. Then, a transmitter of the source node broadcasts a data frame.

If the transmitter receives Extension REQuest EREQ for broadcasting while transmitting Extension REQuests EREQs, the source node may stop transmitting Extension REQuests EREQs and start receiving Extension REQuests EREQs to receive a data frame. At this time, the transmitter increases an ESM retry counter ERC by one. If the ERC is equal to or greater than meshMAXNumESMRetries, the mesh layer issues MESH-DATA.confirm with status CHANNEL_ACCESS_FAILURE. After receiving the data frame or encountering the Lost data condition, the transmitter of the source node retries ESM broadcasting. If the ERC is less than meshMAXNumESMRetries, the mesh layer retries ESM broadcasting.

If the MAC layer confirms with SUCCESS and the transmission is for broadcast, the mesh layer transmits MESH-DATA.confirm to the upper layer. In case the transmission is for reliable broadcast or multicast, the mesh layer follows the decision from its corresponding transmission method.

Figure 6:
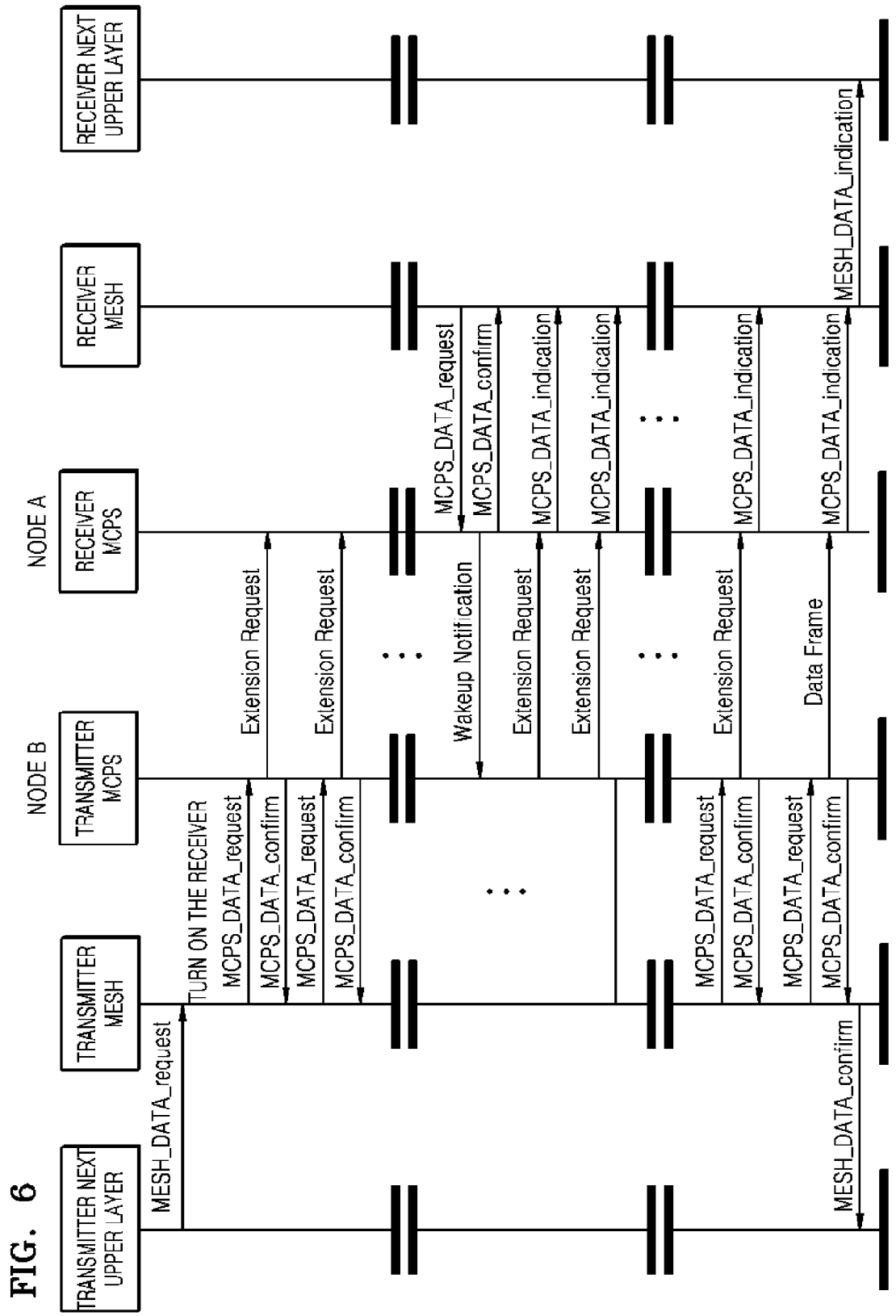
FIG. 6 is a diagram illustrating a flow of a message used by a node in an ESM broadcast, according to an embodiment of the present invention.

FIG. 6 is a diagram illustrating a flow of a message used a node in ESM broadcasting, according to an embodiment of the present invention.

Referring to FIG. 6, in node B having data to be transmitted, when MESH_DATA.request is transmitted from the upper layer to the mesh layer of the transmitter, the mesh sub-layer (MCPS) turns on the receiver. The node B requests the neighbor nodes including the node A to extend the active duration (Extension Request). The node A notifies the wakeup state (Wakeup Notification) to the node B and the node B, which completes the extension request, transmits data frames to the node A.

In the node A and the node B, MCPS_DATA.confirm is transmitted from the mesh sub-layer (MCPS) to the mesh layer before transmitting the command frames such as wakeup notification and extension request and data frame. After the transmission of the frames, MCPS_DATA.confirm is transmitted from the mesh sub-layer (MCPS) to the mesh layer. Also, in the node A and the node B, after receiving the command frames, MCPS_DATA.indication is transmitted from the mesh sub-layer (MCPS) to the mesh layer.

After completing data frame transmission, MCPS_DATA-.confirm is transmitted from the mesh sub-layer to the mesh layer in the node B and MESH_DATA.confirm is transmitted from the mesh layer to the mesh upper layer.

ESM may be started in two ways.

First, if meshESMExpected is set to FALSE, a node may start or join the network without considering the ESM mode. After establishing a mesh layer address, the node can start ESM by setting the meshESMOn to TRUE. Since all associated procedures are performed before starting ESM, the beacon request frame, the association request frame, and the data request frame can be transmitted without considering the ESM mode. Also, a beacon frame and an association response frame are received in the same manner.

Second, if meshESMExpected is set to TRUE, a node assumes that other nodes are running in the ESM mode. The node selects one channel before issuing MLME-SCAN.request by MHSME-DISCOVER-MESH.request, MHSME-START-MESH-NETWORK.request, or HSME-START-MESH-DEVICE.request. Then, the node starts with the ESM broadcasting transmission method. The mesh layer transmits Extension REQuests EREQs during the time longer than one wakeup interval and issues MLME_SCAN, request for one channel. Since the node does not have the mesh address yet, the source address of the Extension REQuest EREQ is set to, for example, 0xffff. ScanDuration is the time for transmitting the Extension REQuest EREQ and is defined for the MAC layer timer. The value of ScanDuration should be interpreted as the approximated value in meshTimeUnit. If the mesh layer primitive requires more than one channel, a temporary scan list can be made for the channels. Then, each channel in the list is scanned in the same manner. After the scan procedure, the node selects one channel to use. This may be achieved according to the mesh layer decision or the parameter in MHSME-START-MESH-DEVICE.request. The node starts a new mesh or transmits an association request frame in the ESM unicasting transmission method. The node waits for the Wakeup Notification WN and transmits the request frame when the Wakeup Notification WN is received. If the node successfully receives an association response, the node sets meshESMOn to TRUE. The node starts transmitting the Wakeup Notifications WNs and schedules active and inactive durations. ScanDuration may be used to set a timer for the Wakeup Notification WN.

If a node that operates in the ESM mode receives the association request frame, the node turns on the receiver circuitry during a predetermined time, for example, 2*mac-ResponseWaitTime. For this exceptional period, the node transmits a Wakeup Notification WN. All data transmissions are the same as in the ESM transmission methods.

Figure 7:
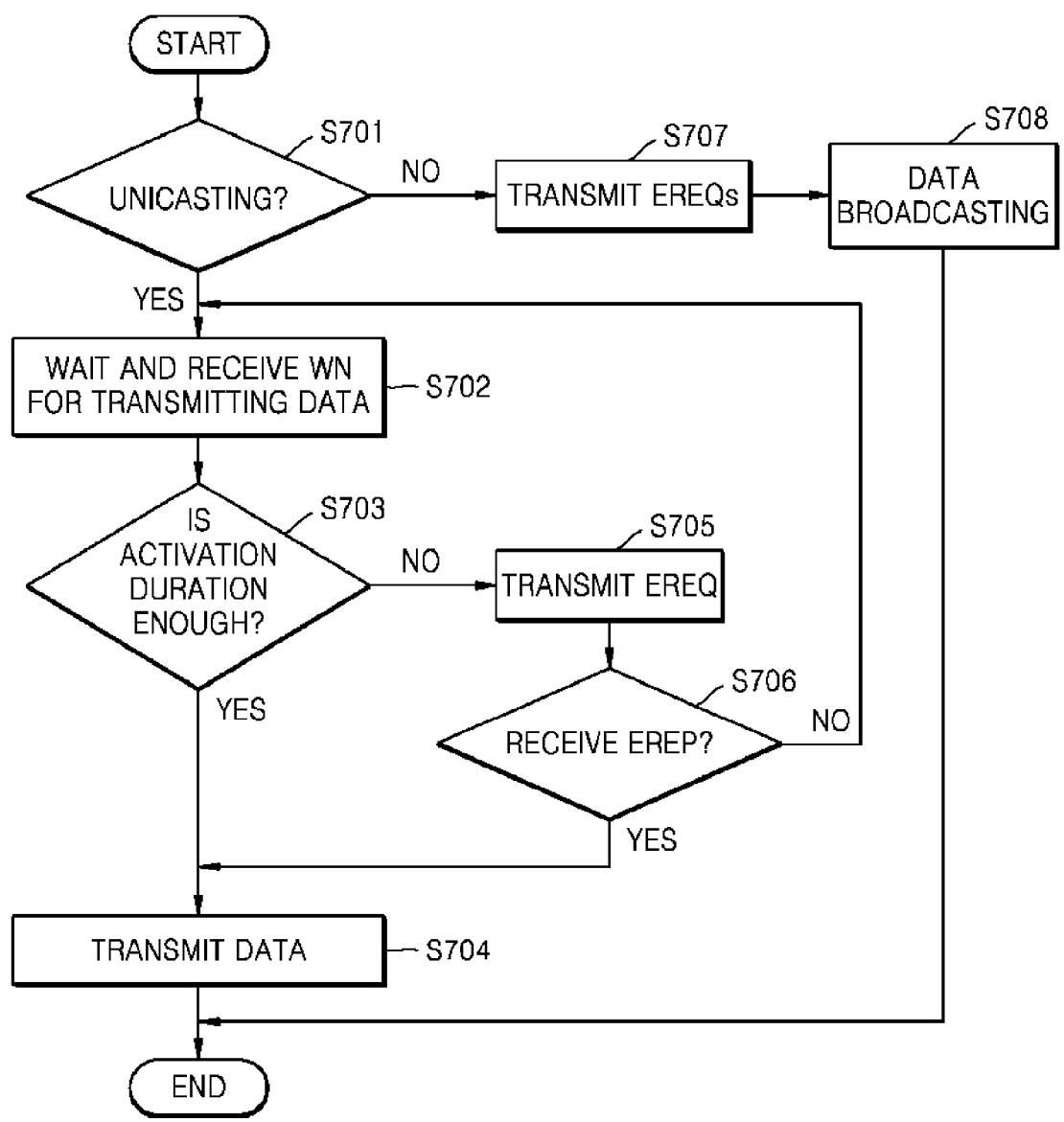
FIG. 7 is a flowchart illustrating a method of transmitting ESM data, according to an embodiment of the present invention.

FIG. 7 is a flowchart illustrating an ESM data transmission method, according to an embodiment of the present invention. Detailed description that is overlapped with above is omitted here.

Referring to FIG. 7, a source node of the ESM mode for transmitting data determines ESM unicasting or ESM broadcasting in operation S701. When the source node determines ESM unicasting, the source node waits for and receives the Wakeup Notification WN from a destination node for data transmission in operation S702. When data to be transmitted exists, the source node in the inactive duration is activated and waits for the Wakeup Notification WN from the destination node. Nodes in the network notify wakeups at a regular interval and the wakeup notification interval is same as the wakeup interval formed of the active duration and the inactive duration. The wakeup notification is performed at the beginning of the active duration and the wakeup interval start times of nodes are not synchronized with each other.

After receiving the Wakeup Notification WN, it is determined in operation S703 whether the active duration of the destination node is enough to transmit data.

When the active duration is enough to transmit data, a data frame is transmitted into the active duration in operation S704. When the active duration estimated based on the Wakeup Notification WN is greater than the data size (or data quantity), it can be determined that the active duration is enough to transmit data.

When the active duration is not enough to transmit data, the Extension REQuest EREQ is transmitted for requesting an extension of the active duration in operation S705. When the active duration estimated based on the Wakeup Notification WN is less than a duration corresponding to the data quantity, it can be determined that the active duration is not enough to transmit data.

Whether the Extension REPly EREP with respect to extending the active duration is received from the destination node is determined in operation S706.

When the Extension REPly EREP is received, the data frames are transmitted within the active duration of the destination node in operation S704 and when the Extension REPly EREP is not received, the node waits to receive the Wakeup Notification WN again in operation S702. When data transmission is completed, the destination node transmits the acknowledgement ACK message and the extended active duration returns to an initial active duration. When data transmission is completed, the source node returns to the inactive duration.

Meanwhile, in case of ESM broadcasting, the source node broadcasts the Extension REQuest EREQ to the neighboring nodes in operation 707 and the data frames are broadcasted after completing the request in operation 708. The source node requests the neighboring nodes to extend the active duration that is longer than the wakeup interval.

Figure 8:
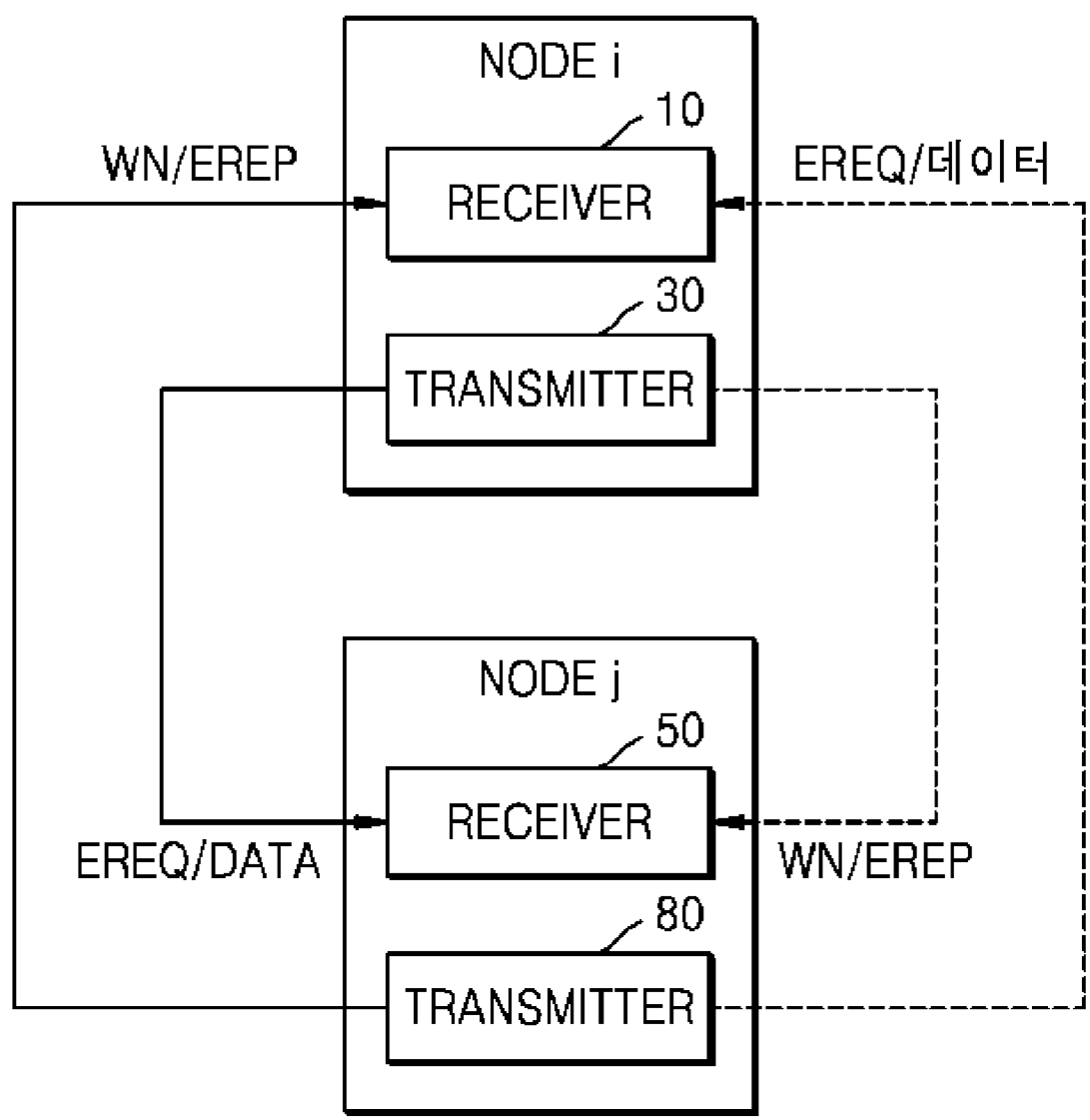
FIG. 8 is a diagram schematically illustrating a flow of a message between nodes that operate in an ESM mode in a network, according to an embodiment of the present invention.

FIG. 8 is a diagram schematically illustrating a flow of a message between nodes that operate in an ESM mode in the network, according to an embodiment of the present invention. Detailed description that is overlapped with above is omitted here.

Referring to FIG. 8, each of nodes i and j respectively includes receivers 10 and 50 and transmitters 30 and 80. In this embodiment, it can be assumed that the node i is transmission node and the node j is reception node, and vice versa.

In node i, the receiver 10 receives the Wakeup Notification WN and Extension REPly EREP in response to Extension REQuest EREQ from the transmitter 80 of node j. The transmitter 30 of node i transmits data within the active duration of node j estimated based on the Wakeup Notification WN and transmits the Extension REQuest EREQ, if necessary, to the receiver 50 of node j. When the estimated active duration is greater than data size (a duration corresponding to the data quantity), the transmitter 30 transmits data within the active duration and when the estimated active duration is less than data size (a duration corresponding to the data quantity), the transmitter 30 transmits the Extension REQuest EREQ and transmits data to the extended active duration after receiving the Extension REPly EREP from node j. In case of ESM broadcasting, the transmitter 30 transmits the Extension REQuest EREQ to neighboring nodes and broadcast data when transmission of the Extension REQuest EREQ is completed. In this case, the Extension REQuest EREQ is the request for extending the active duration that is longer than the wakeup interval.

In node j, the transmitter 80 periodically notifies the Wakeup Notification WN in the same interval as other nodes to the receiver 10 of node i, and the receiver 50 receives data within the active duration and receives data within the extended active duration, when the Extension REQuest EREQ is received from the transmitter of node i. The transmitter 80 transmits the Extension REPly EREP and the acknowledgment ACK message when data reception is completed to the receiver 10 of node i. When data reception is completed, the extended active duration of the node j returns to the original minimum active duration.

Figure 9A:
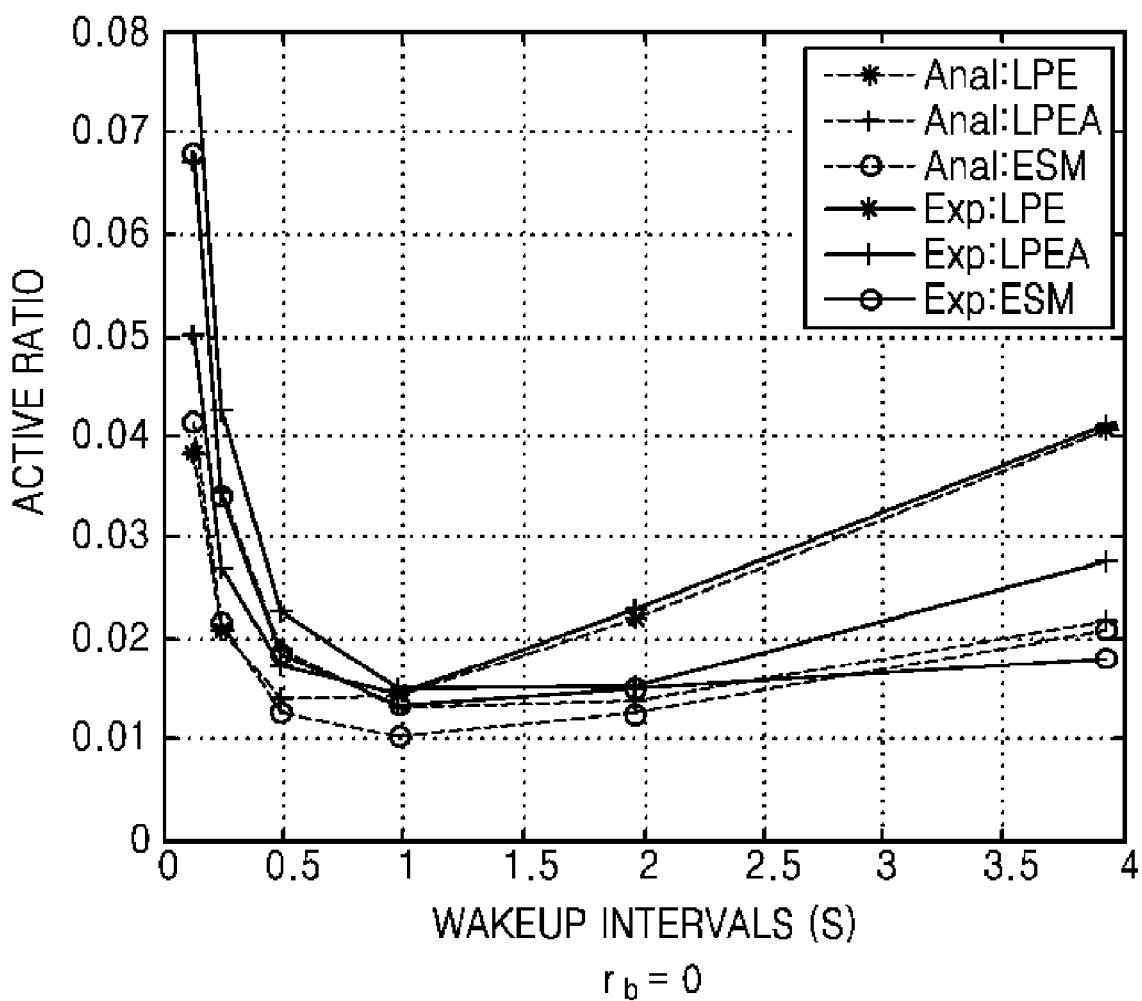
FIGS. 9A and 9B are graphs showing active ratios compared through a simulation and experiment for data transmission/reception in a conventional Long Preamble Emulation (LPE) and LPEA (Long Preamble Emulation with Acknowledgement), and an ESM mode according to the present invention.
Figure 9B:
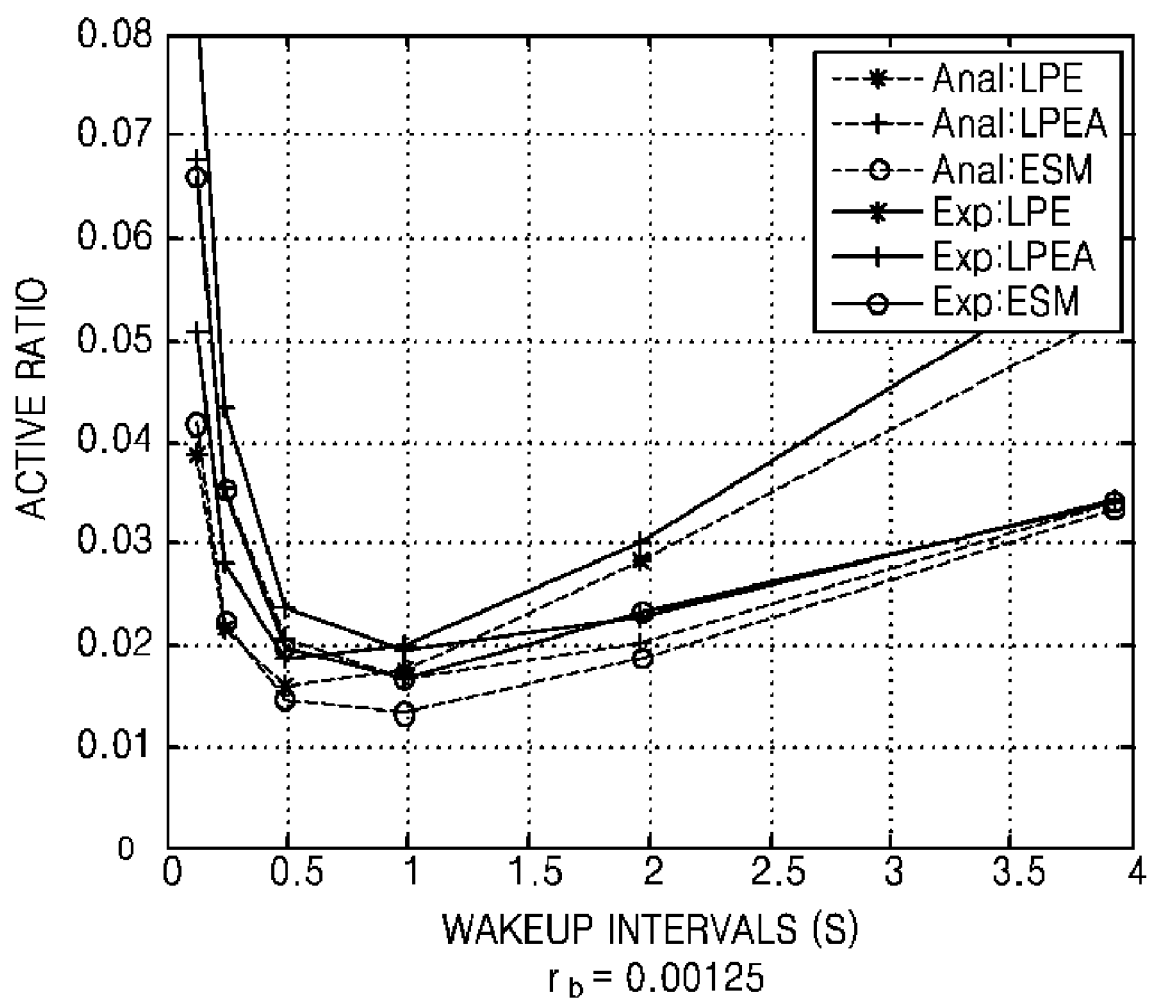

FIGS. 9A and 9B are graphs showing active ratios compared through a simulation and experiment for data transmission/reception in a conventional Long Preamble Emulation (LPE) and Long Preamble Emulation with Acknowledgment (LPEA), and an ESM mode according to the present invention.

The data frame, the Wakeup Notification WN, EREQ/EREP, arrival rate, and the experiment time used in the simulation and experiment are respectively set to 50 byte, 28 byte, 27 byte, 0.01-0.00125 fr/s, and 600-800 s. The active ratio is measured using turn on time/time spent.

The simulation result (anal) is indicated by a dotted line and the experiment result (exp) is indicated by a solid line. In FIG. 9A and FIG. 9B, rb, which is probability of receiving broadcasting frame, is respectively 0 and 0.00125.

Referring to FIGS. 9A and 9B, the active ratio of node in data transmission/reception according to the ESM mode of the present invention is lower than that of in the conventional LPE and LPEA. Accordingly, the active duration is shortened in the present invention in which the active duration flexibly varies so that energy saving is possible.

According to the attribute of the sensor network, the frequency of data transmission is not high or a large quantity of data is not transmitted. Instead, a small quantity of data is transmitted and the frequency of data transmission is low. That is, a sleep mode is maintained most of the time.

Therefore, in general, the active duration is minimized, thereby saving energy. Only when a large quantity of data is transmitted, the active duration is extended in the corresponding time and after the transmission is completed, the extended active duration returns to the minimum active duration again, thereby minimizing power consumption.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An energy saving method performed in a node in a wireless network, the method comprising:
   receiving a wakeup notification from a destination node by a source node having data to be transmitted, wherein the source node is one of a plurality of nodes sending a wakeup notification in a regular interval and a wakeup notification interval is equal to a wakeup interval formed of an active duration and an inactive duration; and
   transmitting data within an active duration of the destination node when the active duration estimated based on the wakeup notification is greater than a data size.

2. The method of claim 1, further comprising:
   requesting an extension of the active duration when the active duration is less than the data size; and
   transmitting data in the extended active duration after receiving a response to the extension of the active duration that is enough to receive data from the destination node.

3. The method of claim 2, wherein the extended active duration of the destination node returns to an initial active duration when data transmission is completed.

4. The method of claim 1, wherein the wakeup notification is transmitted at the beginning of the active duration and wakeup interval start times of the nodes are not synchronized with each other.

5. The method of claim 1, wherein the source node in the inactive duration is active when data to be transmitted exists, so as to wait for the wakeup notification from the destination node.

6. The method of claim 1, wherein the source node returns to the inactive duration when data transmission is completed.

7. An energy saving method performed in node in a wireless network, the method comprising:
   requesting extension of an active duration to neighboring nodes by a source node having data to be transmitted, wherein the source node is one of a plurality of nodes sending a wakeup notification in a regular interval and a wakeup notification interval is equal to a wakeup interval formed of an active duration and an inactive duration; and
   broadcasting data to the neighboring nodes after completing the request.

8. The method of claim 7, wherein the source node requests an extension of the active duration that is longer than the wakeup interval.

9. A node that operates in an energy saving mode in a network, the node comprising:
   a receiver receiving a wakeup notification from a first node in the network; and
   a transmitter sending a wakeup notification in the same interval as the first node and transmitting data in an active duration estimated based on the wakeup notification received from the first node,
   wherein the wakeup notification interval is equal to a wakeup interval formed of the active duration and an inactive duration and wakeup interval start times of nodes of the network are not synchronized with each other.

10. The node of claim 9, wherein the transmitter transmits data within the active duration when the estimated active duration of the first node is greater than data size and requests an extension of the active duration to the first node when the active duration is less than the data size, and transmits data within the extended active duration after receiving a response to the extension of the active duration from the first node.

11. The node of claim 9, wherein the receiver receives a request for an extension of the active duration from a second node and receives data in the extended active duration from the second node, wherein the transmitter transmits a response to the extension of the activation duration to the second node.

12. The node of claim 11, wherein the extended active duration returns to an initial active duration when data transmission is completed.

* * * * *